Figure 1:
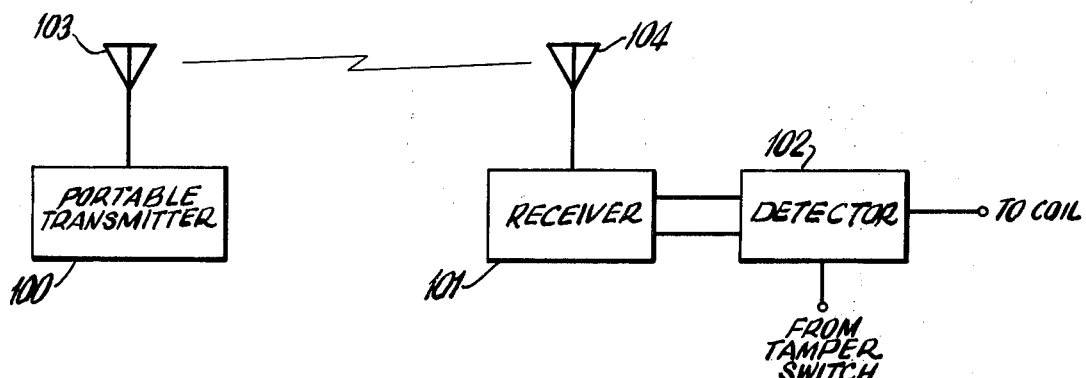

_United States Patent_ [19]

Ballin

[11] 4,159,467
[45] Jun. 26, 1979

[54] ELECTRONIC KEY FOR A MOTOR VEHICLE

[76] Inventor: Joseph Ballin, 19-50 48th St., Astoria, N.Y. 11105

[21] Appl. No.: 825,038

[22] Filed: Aug. 16, 1977

[51] Int. Cl.$^2$ .............................................. B60R 25/04
[52] U.S. Cl. .................................... 340/64; 340/53; 345/539; 343/228; 325/64; 180/114
[58] Field of Search ............... 340/53, 63, 64, 224, 340/539; 325/16, 117, 64; 307/10 AT; 343/225, 227, 228; 180/98, 114; 290/36 R, 37 R, 38 R

[56] References Cited

U.S. PATENT DOCUMENTS

| 3,396,811 | 8/1968 | Bowers et al. | 340/53 X |
| 4,023,138 | 5/1977 | Ballin | 340/64 |

_Primary Examiner_—Alvin H. Waring

_Attorney, Agent, or Firm_—Hopgood, Calimafde, Kalil, Blaustein & Lieberman

[57] ABSTRACT

An electronic key for a motor vehicle includes a hand held portable transmitter carried by the authorized driver of the vehicle and a receiver and associated detection circuitry maintained in the vehicle. The receiver is programmed to respond to periodic identification signals from the transmitter by applying periodic control pulses to the associated detection circuitry. The detection circuitry enables the vehicle in response to the presence of at least one control pulse during each periodic interval and disables the vehicle in response to the absence of a control pulse during any one of the periodic intervals. The electronic key provides individual vehicle control in the same manner as does standard mechanical keys while being highly resistant to tampering or duplication by unauthorized vehicle users.

9 Claims, 3 Drawing Figures

ELECTRONIC KEY FOR A MOTOR VEHICLE

This invention relates to vehicle protection devices and more particularly to an electronic key for a motor vehicle.

The protection of vehicles from theft or unauthorized use is a continuing concern to vehicle owners. This concern has increased in recent years due to the rapid rise in the occurrence of vehicle thefts. Previous methods of vehicle protection have included the use of mechanical locking devices which lock the steering wheel of the vehicle in a fixed position while disabling the vehicle ignition system. These systems are operated by the standard vehicle key which activates or deactivates the mechanical locking systems in a well known manner. The use of such keys, however, has many disadvantages. For example, such keys are readily lost or misplaced. They can also be easily duplicated permitting immediate access to the vehicle by unauthorized personnel. In addition, each vehicle requires a separate key so that the owner or custodian of many vehicles requires a large number of keys with an increased danger of loss or duplication as well as the inconvenience of carrying about such a large number of keys.

It is therefore an object of this invention to provide protection for a large number of vehicles without requiring separate keys for each vehicle.

It is a further object of this invention to provide a vehicle protection system which is controlled by an improved vehicle key which is impossible to duplicate.

One type of an improved vehicle protection system is disclosed in my U.S. Pat. No. 4,023,138 which was issued on May 10, 1977. This system is designed to prevent the unauthorized removal of a vehicle from a parking garage or from other common parking areas which store a large number of unattended vehicles. With this system a receiver mounted in each stored vehicle is designed to receive a constant signal transmitted from a remote transmitter. While the receiver is receiving the signal from the transmitter the vehicle is enabled for normal operation. However, if the vehicle is removed from the storage area by an unauthorized driver the distance between the receiver and the transmitter will exceed a predetermined amount thereby reducing the signal strength at the receiver to less than a predetermined signal level. When this occurs a control circuit is activated which sounds an alarm and disables the vehicle's ignition system. Authorized vehicle drivers are, of course, provided with means to override the protection system to allow such authorized drivers to remove the vehicle as desired.

This system, although providing many advantages over the prior art mechanical key systems described above, does not provide the individual vehicle control at locations remote from the storage area as is provided with the mechanical key systems. In addition, this system can be subject to tampering by an unauthorized individual who knows the transmitter's frequency of operation as the receiver in the system is enabled by a simple steady transmission from the transmitter.

It is, therefore, a further object of this invention to provide an improved vehicle protection system that is resistant to tampering by unauthorized individuals.

It is another object of this invention to provide an improved vehicle protection system which achieves individual vehicle control at remote locations yet does not suffer from the disadvantages inherent in mechanical locking systems.

In accordance with the invention a receiver is placed in each of a plurality of motor vehicles and programmed to receive unique identification signals transmitted at periodic intervals from a portable transmitter. Each receiver in each vehicle is advantageously designed to respond to only its unique identification signal and to no other signal. The transmitter is carried by the vehicle owner and can be programmed to activate one or a plurality of different vehicles. Once activated, the transmitter broadcasts identification signals at periodic intervals and the receiver, along with associated circuitry, decodes the identification signals and enables the vehicle only when at least one identification signal is received during each periodic interval. If the identification signals are absent, for any one of the periodic intervals, the vehicle is disabled. The portable transmitter advantageously provides individual vehicle control at any location. Moreover, the transmitter can control a plurality of vehicles while being impossible to duplicate due to its electronic nature. In addition, the periodic nature of the transmissions render the receiver highly resistant to tampering by unathorized individuals.

Figure 3:
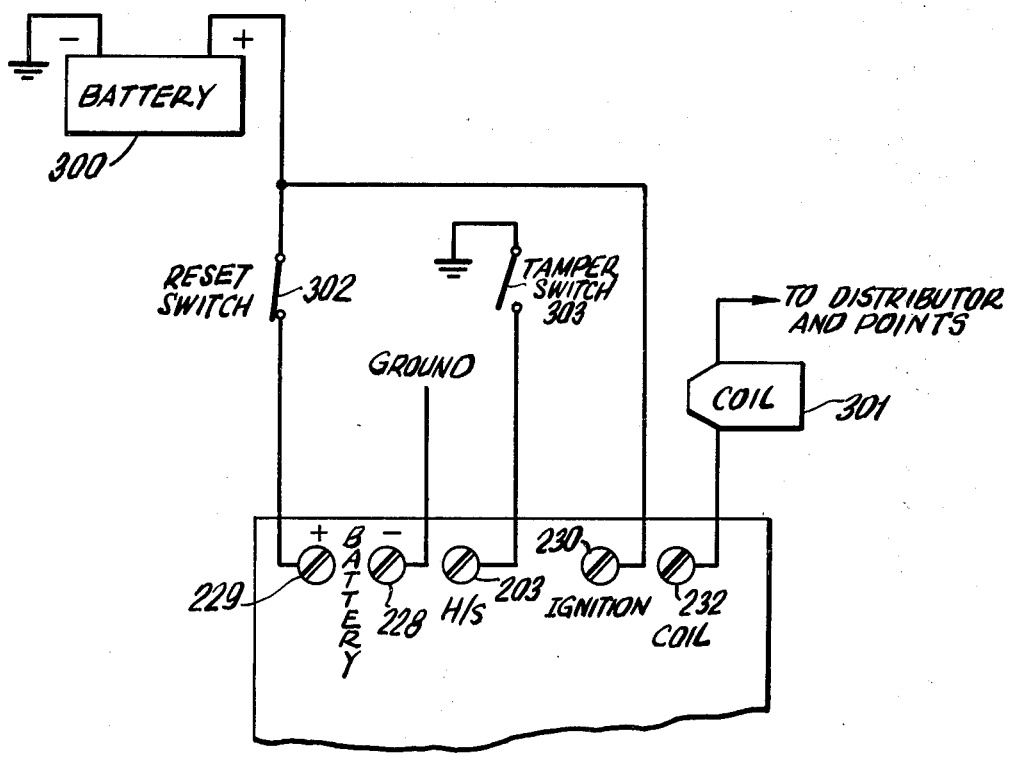
Figure 2:
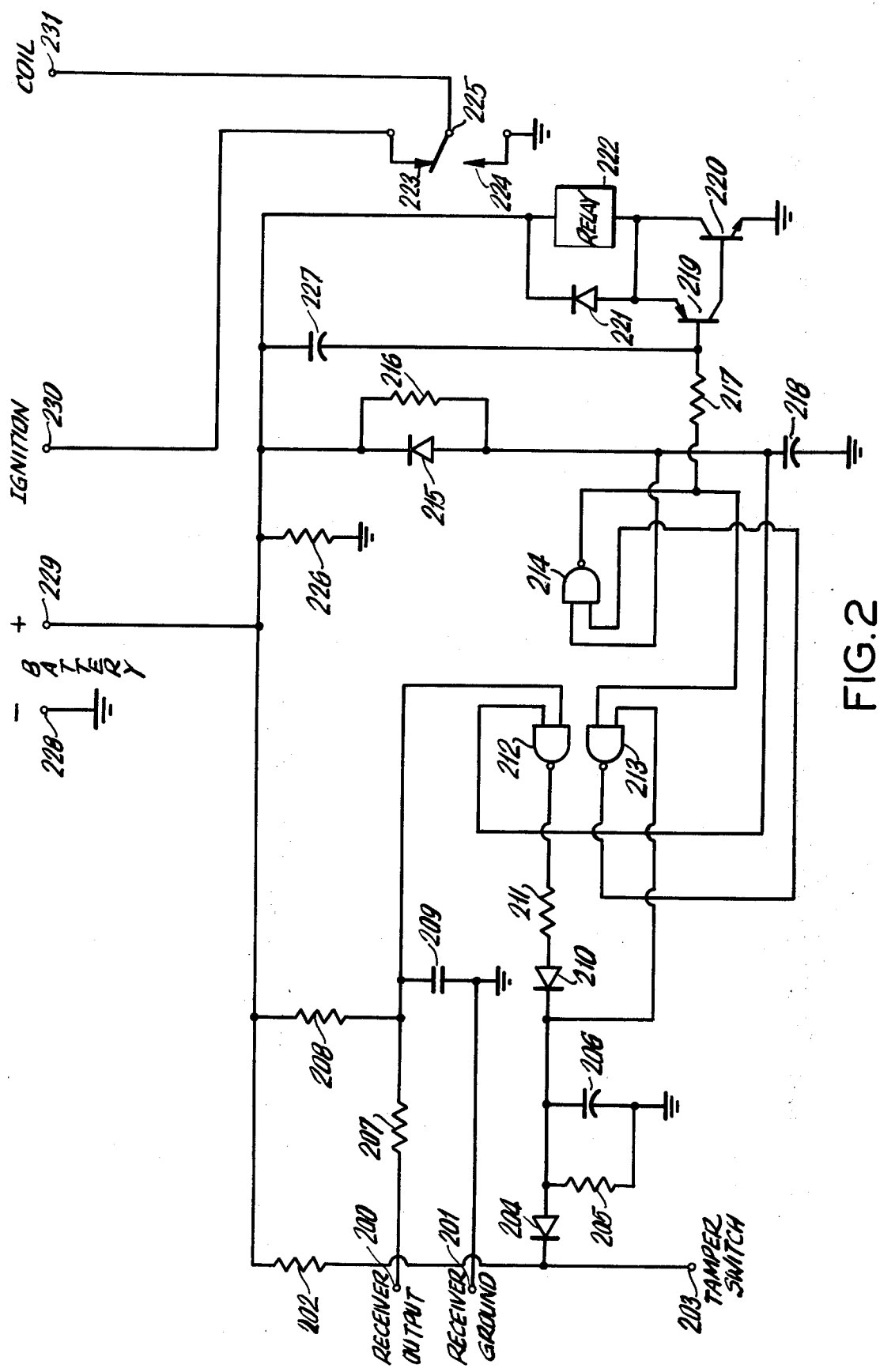

To the accomplishment of the above, and to such further objects as may hereinafter appear, the invention relates to an electronic key for a motor vehicle substantially as defined in the appended claims and as described in the following specification taking in conjunction with the accompanying drawings in which:

FIG. 1 is a block diagram representation of an electronic key system for a motor vehicle, FIG. 2 is a schematic diagram of detection circuitry utilized in the electronic key system; and FIG. 3 is a hook up diagram to facilitate installation of the electronic key system.

Refer to FIG. 1, therein is shown a block diagram representation of an electronic key system for a motor vehicle. The electronic key consists of portable transmitter 100, transmitting antenna 103, receiver 101, receiving antenna 104, and detector 102. Receiver 101 and detector 102 are mounted in the vehicle at a location which is not apparent to an unauthorized user of the vehicle. Detector 102 is connected to the vehicle coil and to a tamper switch for purposes hereinafter described. Transmitter 100 is a portable device hand held by the authorized owner or operator of the vehicle. Transmitter 100 and receiver 101 are tuned to a common frequency of transmission and communicate via the transmitting and receiving antennas in a well known manner. A concise description of transmitter 100 and receiver 101 is not provided herein as their detailed operation will be apparent to one skilled in the art upon reviewing their functional description as given below.

An authorized driver of a motor vehicle utilizing the instant invention uses protable transmitter 100 to activate and deactivate the motor vehicle as easily as does a driver using a standard mechanical key. More particularly, the portable transmitter is programmed by the driver to transmit coded identification signals at periodic intervals to the receiver located in the vehicle. The receiver in turn is programmed to receive only the unique identification signals sent by the portable transmitter and will not respond to other transmitted signals. The receiver decodes the transmitted identification signals and supplies periodic control signals to the detection circuitry in response to the decoded identification signals. The detection circuitry functions to normally disable the vehicle in the absence of a control signal during any one of the periodic intervals. Disabling the vehicle is accomplished by grounding the vehicle coil as will be detailed hereinafter. In the presence of at least one control signal during each periodic interval, however, the detection circuitry ungrounds the vehicle coil thereby allowing the vehicle to be started with normal activation of the starter motor.

To activate a vehicle utilizing the electronic key the authorized driver merely enters the vehicle and turns on transmitter 100. Immediately subsequent thereto the driver would operate a starter button which would provide a reset pulse to detector 102 in a manner to be detailed hereinafter and would also activate the vehicle starter motor. Receiver 101 and detector 102 respond to the periodic signals from transmitter 100 by ungrounding the vehicle coil, thereby allowing the vehicle to start in the normal manner. When the driver completes use of the vehicle the transmitter is turned off and the resultant loss of the signal at the receiver causes the ignition coil to be grounded, thereby disabling the vehicle. Alternatively, of course, the driver can merely leave the vicinity of the vehicle and when the signal strength at the receiver decreases to a predetermined level the receiver will respond to the low signal level and disable the vehicle.

Therefore, it can be seen that transmitter 100 functions in a manner similar to a mechanical key to provide individual control of a vehicle at any location. Moreover, the periodic nature of the transmissions from transmitter 100 make the system highly resistant to tampering as an unauthorized user would have to know the frequency of transmission as well as the length of the periodic intervals. In addition, the electronic nature of the system makes the system components much more difficult to duplicate than a standard mechanical key.

The signaling scheme utilized by the transmitter and the receiver can advantageously be a pulse code modulation signaling scheme in which the transmitter is digitally programmed in any well known manner to broadcast a modulated signal consisting of a series of unique identification signals. The receiver, in turn is also digitally programmed to recognize only one particular identification signal sent by the transmitter. Each transmitter and each receiver can, of course, be reprogrammed at any time to respectively send and receive different identification signals thereby assuring individual control of a plurality of motor vehicles by one of the portable transmitters. It is, of course, recognized that a signaling scheme other than the pulse coded modulation scheme can also be utilized to accomplish individual control of a plurality of motor vehicles by a single transmitter. Therefore, the invention herein is not limited to the use of a pulse coded modulation signaling scheme. The operation of the electronic key will now be described in greater detail by reference to FIG. 2.

Refer to FIG. 2. Therein is shown a schematic drawing of detector 102. The periodic control signals generated by receiver 101 are applied across terminals 200 and 201. Power for the detector is supplied by the vehicle battery via terminals 228 and 229. Similarly, power for the vehicle ignition circuit is supplied by the vehicle battery and applied to terminal 230. Terminal 231 is connected to the vehicle coil and allows the vehicle coil to be grounded and ungrounded in a manner to be subsequently described.

Prior to each operation of the electronic key system it is necessary to reset the detector circuit to assure correct operation. The reset operation is accomplished by momentarily disrupting the supply of battery voltage to the detector circuit and then reapplying battery voltage. Such a reset operation is accomplished with the same switch which activates the starter motor. Although the starter motor will momentarily operate while the reset operation is occurring, the duration of the reset operation is so small that operation of the starter motor before reset is completed has no effect on vehicle operation. The reset operation is accomplished in the following manner.

Assume that supply voltage has been momentarily disrupted and then reapplied to the detector circuit. The application of voltage to the detector circuit applies a positive voltage level (logical "1") to one input of gate 212 via terminal 229 and resistor 208. The remaining input of gate 212 is connected to capacitor 218. Capacitor 218 is discharged at this time as the power disruption allowed it to discharge through diode 215 and resistor 226. With the reapplication of voltage it begins to charge very slowly through resistor 216 which has a large ohmic value. Therefore, when power is first applied capacitor 218 is discharged which applies a logical "0" level to the remaining input of gate 212. Gate 212 is a NOR gate and the logical "1" and "0" on the two inputs forces the output of gate 212 to a logical "1" level. This, causes current to flow through resistor 211 and diode 210 to begin charging capacitor 206 and once capacitor 206 becomes charged it applies a logical "1" level to one input of gate 213.

At this time, gate 214 has one input connected to capacitor 218 which is charging at a much slower rate than capacitor 206. Therefore, at the time capacitor 206 is fully charged capacitor 208 is still applying a logical "0" level to one input of NOR gate 214 which results in its output being forced to a logical "1" level. This logical "1" is applied to the remaining input of NOR gate 213 which in combination with the previously applied logical "1" to the other input causes the output of gate 213 to go low. This applies a low to the remaining input of gate 214.

The logical "1" at the output of gate 214 is also applied to transistor 219 via resistor 217. This logical "1" level ensures that transistor 219 is turned off which in turn ensures that transistor 220 is turned off. This prevents operation of relay 222 which results in contacts 225 of relay 222 being in the position shown in FIG. 2. As indicated in FIG. 2 this position of relay contacts 225 ungrounds the vehicle coil thereby preparing the vehicle for operation.

Capacitor 218 continues to slowly charge through resistor 216. When capacitor 218 is fully charged a logical "1" is applied to one input of gate 212, and to one input of gate 214. The application of the logical "1" level to one input of gate 214 has no effect as the remaining input of gate 214 remains at the logical "0" level applied thereby by gate 213. The application of a logical "1" to one input of gate 212, however, in combination with the logical "1" previously applied to the remaining input causes the output of gate 212 to go low. This, therefore, stops the current flow into capacitor 206, allowing capicitor 206 to begin discharging through resistor 205. The discharge time constant of resistor 205 and capacitor 206 has been advantageously arranged such that capacitor 206 will discharge to a logical "0" level in approximately 45 seconds to one minute. Therefore, when the output of gate 212 goes low, capacitor 206 begins to discharge to a logical "0"

level and will be discharged to a logical "0" level when approximately 45 seconds have passed. This completes the reset procedure.

The reset procedure just described serves to prepare the detector circuit for operation by initially charging capacitor 206 and then allowing capacitor 206 to being its discharge interval and also by ensuring that relay 222 is not operated. When this has been accomplished the detector circuit and thus the motor vehicle is ready to begin operation. Assume now that operation of transmitter 100 is commenced subsequent to completion of the reset procedure. Transmitter 100 will begin transmitting the first identification signals as previously described and these signals will be demodulated and decoded by receiver 101. Receiver 101 will in turn apply control pulses to input terminal 200 in response to each decoded identification signal. The control pulses applied to input terminal 200 are advantageously at a logical "0" level. Therefore, each time a control pulse is applied to input terminal 200 a logical "0" is applied to one input of gate 212 via resistor 207. The remaining input of gate 212 is at a logical "1" level as has been hereinbefore described. Therefore, upon each application of a logical "0" control pulse to input terminal 200, the output of gate 212 goes high. This allows capacitor 206 to charge as has been previously described. In normal operation, therefore, a logical "0" control pulse will be received at input terminal 200 in response to each identification signal. Each time a control pulse is received capacitor 206 will be recharged in the manner previously described.

It can readily be seen therefore that continued operation of transmitter 100 results in the application of logical "0" control pulses to input terminal 200 detector 102. Each control pulse results in the recharging of capacitor 206 thereby preventing the discharge of this capacitor. As long as the control signals from receiver 101 continue to occur at intervals of less than 45 seconds capacitor 206 will never discharge to the logical "0" level but will be maintained at a charged level equal to a logical "1".

Assume now that transmitter 100 is turned off by the authorized owner of the vehicle. At this time, the transmitted signal will be lost and receiver 101 will cease applying the control signals to terminal 200. When this occurs the output of gate 212 will remain at a logical "0" level thereby allowing capacitor 206 to completely discharge through resistor 205. The discharge of capacitor 206 applies a logical "0" to one input of gate 213, thereby forcing the output of gate 213 to a logical "1". This logical "1" level is applied to one input of gate 214 while the remaining input of gate 214, which is connected to capacitor 218, is also at a logical "1" level. Therefore, the output of gate 214 goes low and applies a logical "0" level to the input of transistor 219 through resistor 217. This application of the logical "0" to transistor 219 turns this transistor ON which in turn turns ON transistor 220. The turn on action of transistor 220 activates relay 222 which causes relay contacts 225 to operate and to establish a path to ground between terminal 231 and terminal 224. This action serves to ground the vehicle coil thereby disabling the vehicle.

From the foregoing it can be seen that turning off transmitter 100 results in a loss of the control pulses applied by receiver 101 to terminal 200. This loss of the periodic control pulses allows capacitor 206 to discharge to a logical "0" level which in turn results in the activation of relay 222 in the manner previously described. Activation of relay 222 disables the vehicle by grounding the vehicle coil.

The logical "0" level from the output of gate 214 which turned on transistor 219 is also applied to one input of gate 213. This action forces the output of gate 213 high, thereby insuring that one input of gate 214 will be latched high. The remaining input of gate 214 is also high as it is tied to charged capacitor 218. This therefore insures that the output of gate 214 will remain low thereby continuously operating relay 222 and disabling the vehicle. This latching action insures that once relay 222 is activated it will remain activated until the power to the detection circuit is turned off and reapplied at which time the reset action previously described occurs to reset the detector circuit.

In summary then, the reset procedure described above serves to charge capacitor 206 and then allows this capacitor to begin discharging. The reset procedure also prohibits operation of relay 222 which serves to unground the vehicle coil therby allowing the vehicle to be started. In the presence of identification signals from transmitter 100 at intervals of less than 45 seconds capacitor 206 will remain charged, relay 222 will not operate and the vehcile will function normally. However, in the absence of identification signals from the transmitter capacitor 206 will fully discharge. This action serves to operate relay 222 in the manner described above which grounds the vehicle coil and disables the vehicle. Once disabled, the vehicle will remain latched in this state until an authorized driver resets the detection circuit and then within 45 seconds commences operation of transmitter 100.

Refer to FIG. 3. Therein is shown a hookup diagram for the electronic key system. As is shown voltage from battery 300 is applied to ignition terminal 230. Switch 302 is the reset switch which serves to momentarily disrupt power to the detector circuit to accomplish the reset procedure as previously described. Swtich 302 can also serve in a well known manner to operate the starter motor circuit (not shown) with an auxiliary set of contacts. Tamper switch 303 is a tamper switch which can be installed in the hood, trunk, or doors of the vehicle. This switch is normally open but will close upon an unauthorized attempt to open the hood, trunk, or doors of the vehicle. The use of such tamper switches is well known in the art. When switch 303 closes terminal 203 is grounded. Referring to FIG. 2 it is seen that once terminal 203 is applied to ground capacitor 206 is immediately discharged and subsequent charging pulses from the output of gate 212 are also applied to ground. The discharge of capacitor 206 activates the detector circuit in the manner described above. Therefore, any unauthorized attempt to enter the vehicle will activate the tamper switch and immediately disable the vehicle thereby preventing further theft attempts. Terminal 232 is connected to the vehicle coil and in turn to the automotive points as is shown in FIG. 3.

Although a specified embodiment of this invention has been shown and described it will be understood that various modifications may be made without departing from the spirit of the invention.

What is claimed is:

1. An electronic vehicle key comprising, means for transmitting identification signals at periodic intervals to a receiver located in the vehicle, means included in the receiver and responsive to the identification signals for generating at least one control signal during each periodic interval, means responsive to the occurrence of at least one control signal during each periodic interval for enabling the vehicle and means responsive to the absence of a control signal during any one of the periodic intervals for disabling the vehicle, said disabling means including gated relay means being operable to deactivate the vehicle ignition system, means responsive to each control signal for producing charging pulses, timing means responsive to the presence of at least one charging pulse during each periodic interval for preventing operation of the gated relay means and responsive to the absence of charging pulses during any one of the periodic intervals for enabling operation of the gated relay means, said electronic vehicle key further including means responsive to an unauthorized entry of the vehicle for preventing production of the charging pulses, whereby said timing means enables operation of said gated relay means to deactivate the vehicle ignition system.

2. An electronic key in accordance with claim 1, wherein said gated relay means includes switch means connected to the vehicle battery for applying battery voltage to the coil of the vehicle when said relay means are not operated and for connecting said coil to vehicle ground potential when said relay means are operated.

3. An electronic vehicle key in accordance with claim 2, wherein said timing means includes latching means responsive to an initial operation of said relay means for latching said relay means in an operated state until said latching means are reset.

4. An electronic vehicle key in accordance with claim 3, further including means responsive to each application of battery voltage to said enabling and disabling means for resetting said latching means.

5. An electronic vehicle key, comprising means for transmitting identification signals at periodic intervals to a receiver located in the vehicle, each of said periodic intervals being of a predetermined and equal duration, means included in the receiver and responsive to the identification signals for generating at least one control signal during each periodic interval, gated relay means being operable to deactivate the vehicle ignition system, timing means responsive to the presence of at least one control signal during each periodic interval for preventing operation of the relay means and responsive to the absence of a control signal during any one of the periodic intervals for enabling operation of the relay means.

6. An electronic vehicle key in accordance with claim 5, wherein said relay means includes transistor gating means being biased in a non-conductive state in response to the presence of at least one control signal during each periodic interval and being biased in a conductive state in response to the absence of a control signal during any one of the periodic intervals.

7. An electronic vehicle key in accordance with claim 6, further including latching means responsive to the initial biasing of the transitor gating means in the conductive state for latching said gating means continuously in the conductive state until said latching means are reset.

8. An electronic vehicle key in accordance with claim 7, further including means responsive to each application of battery voltage to said timing means for resetting said latching means.

9. An electronic vehicle key in accordance with claim 8 wherein the predetermined and equal duration of said periodic intervals is no greater than one minute.

* * * * *